May 17, 1932.  P. H. BRACE  1,858,386
PROCESS FOR PREPARING AND PURIFYING ALLOYS
Filed Nov. 7, 1927
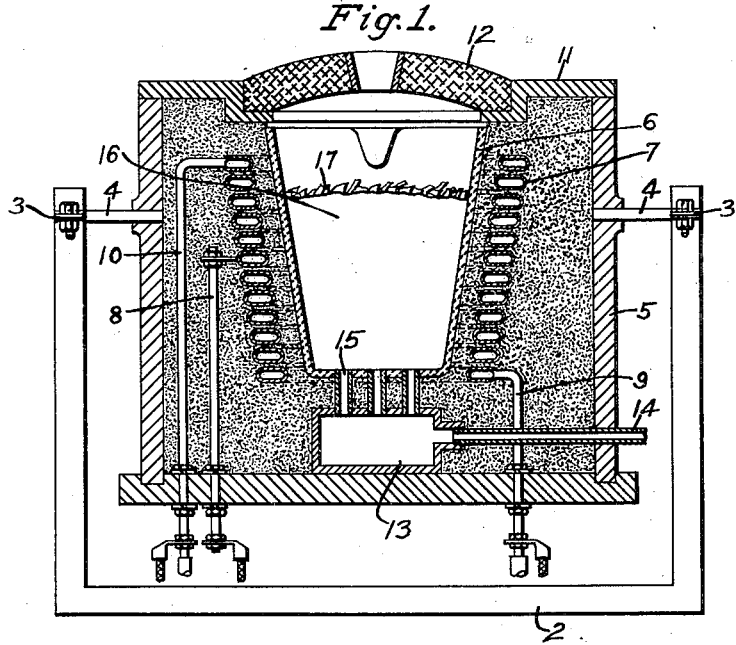
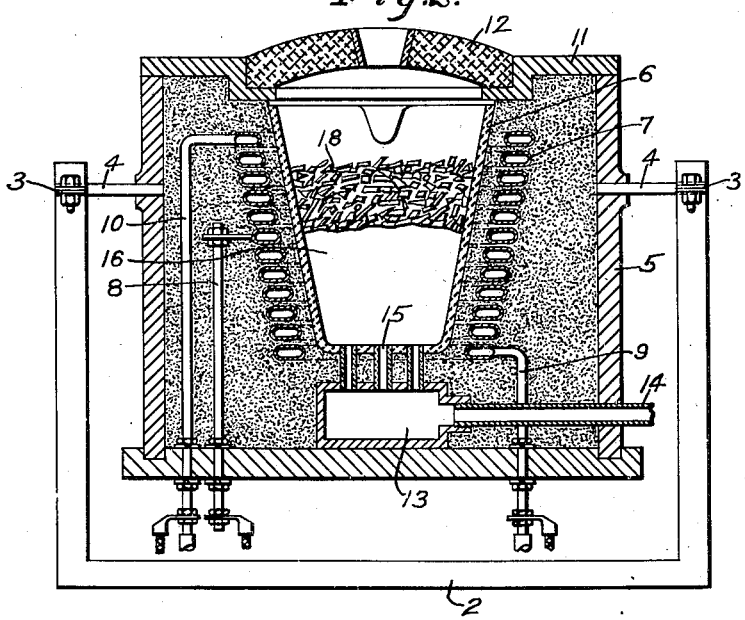
INVENTOR
Porter H. Brace
BY
ATTORNEY Patented May 17, 1932

1,858,386

UNITED STATES PATENT OFFICE

PORTER H. BRACE, OF WILKINSBURG, PENNSYLVANIA, ASSIGNOR TO WESTINGHOUSE ELECTRIC & MANUFACTURING COMPANY, A CORPORATION OF PENNSYLVANIA

PROCESS FOR PREPARING AND PURIFYING ALLOYS

Application filed November 7, 1927. Serial No. 231,477.

This invention relates to a process for the purification of metals and more particularly to a process for the purification of iron alloys, such as silicon steel, for the purpose of improving their magnetic qualities.

An object of the invention is to provide a method for the treatment of iron alloys in a molten condition for the purpose of removing impurities, such as carbon, oxygen and sulphur.

Another object of the invention is to provide a process for the purification of silicon steel in such manner as to conserve or increase its silicon content while removing the impurities which are deleterious to the magnetic properties of the steel and thus to produce a final product having unusually good magnetic properties.

A further object of the invention is to provide a process for the recovery of metal scrap, and, particularly scrap silicon steel, in such manner as to remove the oxides and other impurities, thereby obtaining a product which has magnetic properties which are equal or superior to the original material from which the scrap was obtained.

A still further object of the invention is to provide a method for the purification of a silicon-steel alloy which consists essentially in maintaining the alloy in a heated or molten condition while passing hydrogen or a hydrogen-bearing gas through the heated or molten metal for the purpose of removing such ingredients as are deleterious to the steel and more particularly those which affect the magnetic properties of the alloy.

A still further object of the invention is to provide a method of preparing alloys which consists essentially in maintaining the basic metal of the alloy in a molten condition in an induction furnace, adding metal oxides or other reducible compounds of the desired alloying ingredients, and passing a reducing gas, such as hydrogen, through the mixture.

Iron alloys and particularly iron-silicon alloys are widely used for magnetic purposes under conditions demanding the utmost excellence of magnetic properties. The impurities in the alloy affect the magnetic qualities of the metal and it is essential that they be removed as completely as possible because the effect of small quantities becomes more marked as the alloy is brought nearer its pure state.

It is known that impurities, such as carbon, sulphur, phosphorus and manganese, adversely affect the magnetic properties of the metal and I have discovered that oxygen also has a harmful effect.

My improved process not only removes carbon and sulphur but also oxygen, and an alloy is produced having not only exceptional magnetic qualities but one that is also improved in other respects, as it is believed that my improved process of removing the oxygen from iron or iron alloys will eliminate the abnormality often found in low-carbon steels, with respect to their behavior in case hardening.

The process which I have discovered is also particularly adapted for the recovery of steel scrap. Many steel alloys are used in such manner as to produce a considerable quantity of unsalable scrap. Heretofore, scrap silicon steel has been disposed of either by adding it to molten pig iron, or other charges for steel-making furnaces, or by remelting the scrap and recasting it into ingots for further treatment. The process of adding the scrap to furnace charges was frequently impracticable, as the scrap generally contained dirt, scale and oxides of the alloyed ingredients that not only contaminated the charge but were also injurious to the furnace lining.

An example presented in recovering the scrap from high-grade sheet silicon steel is a typical illustration of the difficulties which are encountered. Silicon-steel alloys, in sheet form, which have been annealed before punching are often enameled and are always covered with an oxidized scale formed during annealing. The scrap produced from the cutting and punching operation on such sheet material is very undesirable as melting stock for any ordinary furnace, and attempts to purify it have resulted in the loss of the desirable silicon content and the introduction of impurities which rendered the resulting product inferior to the original high-grade alloy upon which much time and skill have been spent to produce the high magnetic qualities required in steels of this type.

Attempts to refine silicon-steel scrap by itself have not been successful. When an acid-lined furnace was employed, the sulphur could not be removed, while, when a basic-lined furnace was employed, the furnace lining was damaged by the silica which was formed by the oxidation of the silicon. In either case, the silicon was oxidized, impurities were introduced, and a steel inferior to the original sheet material was obtained.

In practicing my process, when applied to the preparation of alloys, the basic metal is maintained in a molten condition in an induction furnace, metal oxides or other reducible compounds of the alloying ingredients are added and a reducing gas is passed through the mixture. For example. when this process is applied to the preparation of iron silicon alloys, the iron is maintained in a molten condition, a reducible compound of silicon, such as silica, silicon chloride or silicon carbonate is added, and a hydrogen bearing gas is passed through the mixture. The hydrogen reduces the silica or other silicon compound to the desired state so that it will form an alloy with the molten iron.

My improved process will be better understood by reading this specification in conjunction with the accompanying drawings, in which:

Figure 1 is a vertical cross-sectional view of an induction furnace illustrating the means for practicing my process, as applied to the refinement of iron in the molten state; and Fig. 2 is a vertical cross sectional view of an induction furnace illustrating the means for practicing my process, as applied to the purification of scrap iron, showing the iron partly in the molten and partly in the solid state.

Referring to Fig. 1 of the drawings, the induction furnace comprises a supporting frame 2 provided with bearings 3—3 to receive trunnions 4—4 carried by the furnace and providing means by which the furnace may be tilted for any purpose, such as discharging its contents.

The furnace proper comprises a cylindrical shell or casing 5, a crucible 6 and an inductor coil 7 disposed circumferentially around the crucible 6. The crucible 6 may be made of any suitable refractory material, as zirconium silicate. The inductor coil 7 comprises a plurality of turns of a conductor and is provided with a plurality of terminal posts 8, 9 and 10 which are connected to the uppermost, lowermost and intermediate coils, respectively.

The inductor coil employed in the furnace in which my process is practiced may be made hollow and oval in cross section to fit into a small space, and to facilitate cooling by passing water or other suitable cooling medium therethrough in order to keep the material of which the coil is made at a safe operating temperature.

The intervening space between the crucible 6 and the casing 5 may be filled with a suitable pulverized material, such as zirconium silicate. An annular ring 11, offset at its innermost portion, constitutes the top of the casing, the offset portion providing a seat for a cover 12 made of a suitable refractory material and provided with an opening at its central portion for purposes to be hereinafter described.

The furnace so far described is somewhat similar to the furnaces disclosed in the co-pending applications of R. B. Lincoln, Serial No. 176,885, filed March 21, 1927, and Porter H. Brace, Serial No. 125,165, filed July 27, 1926, both of which are assigned to the Westinghouse Electric & Manufacturing Company. As will be observed by reference to these cases, the furnaces disclosed may or may not be provided with iron cores in their magnetic circuits. Furnaces of such type which are operable to produce the melting of current-conducting materials at low frequencies, of the order of 25 to 350 cycles per second, are particularly adapted for use in my improved process.

At the lower portion of the furnace, I provide a chamber 13 provided with a gas-supply pipe 14 leading into the chamber, and tuyères 15 leading into the crucible 6. In practicing my process, in the furnace shown in Fig. 1 of the drawings, molten metal 16 is introduced into the furnace from an arc or open-hearth furnace or from a Bessemer converter, and a small quantity of silica 17 is added, which results in the formation of a slag on the surface of the molten metal. While the metal is being maintained molten by the electrical energy supplied to the inductor coil 7, hydrogen or a hydrogen-bearing gas, such as hydrogen mixed with carbon monoxide, hydrocarbon gas, or nitrogen, is delivered, under pressure, through the pipe 14 into a chamber 13 and through the tuyères 15 and the molten metal. The hydrogen combines with the sulphur, phosphorus and oxygen in the metals and carries off these impurities in the form of gaseous hydrogen compounds. The hydrogen also reduces the silica to silicon, combining with the oxygen to form water vapor.

In a particular case, iron containing approximately 4% of carbon and 1% of silicon was converted into an alloy containing 2.5% silicon and less than .004% of carbon. After suitable annealing, this refined alloy possessed unusually good magnetic properties, having a hysteresis loss of 611 ergs per cubic centimeter per cycle for B=10,000 gausses and having a maximum permeability of 24,400. In another similar sample, the carbon was decreased by my improved process to .0036% and the silicon content was increased to 4%. The hysteresis loss was 551 ergs per cubic centimeter per cycle and the maximum permeability was 17,500.

Fig. 2 of the drawings illustrates the manner of practicing my invention when the process is applied to the recovery of scrap steel. Steel, in the form of scrap, is introduced into crucible 6 of the induction furnace and is subjected to the direct action of hydrogen or a hydrogen-bearing gas, while it is being brought to the molten state.

A current of hydrogen or a hydrogen-bearing gas is maintained flowing through the furnace during the melting period to avoid oxidation and to prevent the molten metal from flowing down through the tuyères. The subsequent refining operations are conducted in the same manner as when the molten metal was originally introduced into the furnace.

The furnace for this process may be of the same construction as that used for purification of molten iron, and silica may be added if it is desired to increase the silicon content of the purified scrap. The numerals applied to the furnace shown in Fig. 2 of the drawings are the same as those applied to the furnace shown in Fig. 1, the reference numeral 18 being added to designate the scrap steel in the solid state. The hydrogen combines with the oxides of the molten scrap and removes the impurities, such as phosphorus, sulphur and oxygen, so that the final product which I obtain by my improved process will be as good as, and may be superior to, the original sheet material from which the scrap was obtained.

In order that the advantages of my process may be fully appreciated, the results obtained from a particular case when scrap from 4% silicon steel was remelted in an induction furnace and hydrogen was bubbled through the molten metal, will be given. The carbon content was reduced from .028% to .0063%. The silicon content was only slightly lower than that of the initial material and the resulting product forged well and had very good magnetic properties.

Various modifications of my invention will of course, be apparent to those skilled in the art; for example, the iron alloy may be introduced into the induction furnace either in a solid or in a molten condition. When my process is applied to the recovery of scrap material, it is preferred that the material be introduced into the induction furnace in a solid form, as it is impractical to melt such scrap in ordinary furnaces for reasons hereinbefore indicated and, furthermore, an appreciable amount of the impurities may be removed from the scrap while it is being reduced to the molten state.

When the process is applied to the purification of original metals, the metal may be introduced into the furnace either in a solid or in a molten state. It is preferred however, for economical reasons, that the metal be introduced into the furnace in a molten condition.

While I have described specific embodiments of my invention, various changes may be made without departing from the spirit or scope of my invention as defined in the appended claims.

I claim as my invention:

1. The process of purifying an iron alloy which comprises placing it in an induction furnace in a molten condition and passing a stream of hydrogen-bearing gas free from oxidizing ingredients through it and maintaining a reducing atmosphere over the surface of the molten metal, said alloy being maintained in a molten condition by electrical energy supplied to said furnace.

2. The process of purifying an iron alloy which comprises placing it in an induction furnace in the solid form and subjecting it to the action of a hydrogen-bearing gas free from oxidizing ingredients while sufficient electrical energy is being supplied to said furnace to melt said alloy and continuing the passage of the gas through the metal and maintaining a reducing atmosphere over the surface of the metal while it is in a molten condition.

3. The process of improving the magnetic properties of silicon steel which comprises placing said steel in an induction furnace in a molten condition, adding silica to the molten metal and passing a hydrogen-bearing gas through said steel while it is being maintained in the molten condition by electrical energy supplied to said furnace.

4. The process of improving the magnetic properties of silicon steel containing sulphur, phosphorus, carbon and oxygen which comprises placing the steel in an induction furnace in a molten condition, adding silica to the steel and maintaining it in a molten condition while a stream of hydrogen-bearing gas is forced through it, the hydrogen removing the sulphur, phosphorus and oxygen in the form of gaseous hydrogen compounds and reducing the silica to silicon.

5. The process of recovering metal scrap which comprises placing it in an induction furnace, passing a stream of a hydrogen-bearing gas free from oxidizing ingredients through the scrap while said metal is being reduced to the molten state, and maintaining the flow of said gas through the molten metal and over its surface after said scrap has been entirely reduced to the molten state, said metal being maintained in a molten condition by means of electrical energy supplied to said furnace.

6. The process of preparing an alloy which comprises placing the metal forming the major ingredient of said alloy in an induction furnace, adding reducible compounds of the desired alloying ingredients, and passing a reducing gas through the mixture to reduce said alloying ingredients to such state that they will form an alloy with said major ingredient while it is being maintained in the molten state by electrical energy supplied to said furnace.

7. The process of preparing an alloy which comprises placing the metal comprising the major ingredient of said alloy in an induction furnace, adding oxides of the desired alloying ingredients and passing a reducing gas through said mixture to reduce said oxides to a metal which alloys with said major ingredient, the first-named metal being maintained in a molten condition by electrical energy supplied to said furnace.

8. The process of preparing an iron-silicon alloy which comprises placing iron in an induction furnace, adding silica to the iron and passing hydrogen through the mixture while the iron is being maintained in a molten condition by electrical energy supplied to said furnace, the hydrogen being passed through the metal until the silica is reduced to silicon which forms an alloy with the molten metal.

9. The process of recovering silicon-steel scrap which comprises placing the scrap in an induction furnace and melting it by means of electrical energy while simultaneously passing a hydrogen-bearing gas through the scrap and maintaining a sufficient supply of said gas to prevent the molten metal from passing through the tuyères through which the hydrogen is introduced and to maintain a reducing atmosphere over the surface of the metal.

10. The process of recovering silicon-steel scrap which comprises placing the scrap in an induction furnace and completely melting the scrap by means of electrical energy while simultaneously passing a hydrogen-bearing gas free from oxidizing ingredients through the scrap and maintaining a sufficient supply of said gas to prevent the metal from passing through the tuyères through which the hydrogen is introduced and to maintain a reducing atmosphere over the surface of the metal.

11. The process of recovering silicon-steel scrap which comprises placing the scrap in an induction furnace and completely melting the scrap by means of electrical energy while simultaneously passing a gas, consisting essentially of hydrogen, through the scrap and maintaining a sufficient supply of said gas to prevent the metal from passing through the tuyères through which the hydrogen is introduced and to maintain a reducing atmosphere over the surface of the metal.

In testimony whereof, I have hereunto subscribed my name this 4th day of November, 1927.

PORTER H. BRACE.